(12) United States Patent
Hemphill et al.

(10) Patent No.: US 10,777,990 B2
(45) Date of Patent: Sep. 15, 2020

(54) UNDERWATER CABLE REPAIR HABITAT

(71) Applicant: Moyle Interconnector Limited, Belfast (GB)

(72) Inventors: Stephen James Hemphill, Belfast (GB); Michael John McGuckin, Belfast (GB); Maurice Patrick Smith, Dublin (IE); Gerard Joseph Rathborne, Dublin (IE); Patrick James O'Rourke, Dublin (IE)

(73) Assignee: MOYLE INTERCONNECTOR LIMITED, Belfast (GB)

( * ) Notice: Subject to any disclaimer, the term of this patent is extended or adjusted under 35 U.S.C. 154(b) by 30 days.

(21) Appl. No.: 15/755,728

(22) PCT Filed: Aug. 28, 2015

(86) PCT No.: PCT/EP2015/069798
§ 371 (c)(1),
(2) Date: Feb. 27, 2018

(87) PCT Pub. No.: WO2017/036503
PCT Pub. Date: Mar. 9, 2017

(65) Prior Publication Data
US 2019/0027916 A1 Jan. 24, 2019

(51) Int. Cl.
*H02G 15/14* (2006.01)
*H02G 1/10* (2006.01)
(Continued)

(52) U.S. Cl.
CPC .............. *H02G 15/14* (2013.01); *B25J 21/02* (2013.01); *H02G 1/10* (2013.01); *H02G 1/16* (2013.01)

(58) Field of Classification Search
CPC .... H02G 15/14; G02B 6/4427; G02B 6/4467; B60N 2/70; B63C 11/40
See application file for complete search history.

(56) References Cited

U.S. PATENT DOCUMENTS 4,172,212 A 10/1979 Itt
4,958,903 A 9/1990 Cobb et al.

FOREIGN PATENT DOCUMENTS

EP 0247791 A2 12/1987
GB 2145580 A 3/1985
(Continued)

OTHER PUBLICATIONS

Group et al: "2012-13 MDDP: Final Report #2—Underwater Vehicle for Submarine Cable Maintenance Supervisors: Dr Janko Calic, Prof Marios Chryssanthopolous and Contents".
(Continued)

*Primary Examiner* — Andrew Polay
(74) *Attorney, Agent, or Firm* — Schmeiser, Olsen & Watts, LLP (57) ABSTRACT

A submersible habitat chamber providing a contained environment for repairing subsea cable is provided. The habitat chamber includes first and second shell parts assembled to at least partly define the contained environment, a first seal provided between the first and second shell parts, a cable seal provided for engagement with the cable, and at least one access port through at least one of the shell parts to allow a user to access the contained environment from outside the habitat. A method of using the habitat chamber and a kit for assembly of the chamber are also provided.

34 Claims, 3 Drawing Sheets

(51) Int. Cl.
   *B25J 21/02* (2006.01)
   *H02G 1/16* (2006.01)

(56) References Cited

FOREIGN PATENT DOCUMENTS

| | | |
|---|---|---|
| GB | 2180896 A | 4/1987 |
| JP | H0995294 A | 4/1997 |
| JP | 2001095123 A | 4/2001 |

OTHER PUBLICATIONS

International Search Report for PCT/EP2015/069798; International Filing Date: Aug. 28, 2015.
Written Opinion for PCT/EP2015/069798. International Filing Date: Aug. 28, 2015.
University of SURREY MDDP: Final Report #1—Underwater Vehicle for Submarine Cable Maintenance 2012-13; 84 pgs.
Group et al: "2012-13 MDDP: Final Report #3—Underwater Vehicle for Submarine Cable Maintenance Supervisors: Dr Janko Calic, Prof Marios Chryssanthopolous and Contents".
Spivey, Reggie: An Overview of the Microgravity Science Glovebox (MSG) Facility, and the Gravity-Dependent Phenomena Research Performed in the MSG on the International Space Station (ISS); 59$^{th}$ International Astronautical Congress 2008 Glasgow, Scotland.
Marine Technology Limited: "Subsea Cable Repair",Nov. 1, 2014 (Nov. 1, 2014 ), XP055625633, Retrieved from the Internet: URL:https://www.marinetechnology.ie/single-post/2014/11 /01 /SubseaCable-Repair.
Communication Pursuant to Article 94(3) EPC dated Sep. 30, 2019 for Application No. 15 756 652.2.

UNDERWATER CABLE REPAIR HABITAT

CROSS-REFERENCE TO RELATED APPLICATIONS

This application claims priority to PCT Application No. PCT/EP2015/069798, having a filing date of Aug. 28, 2015, the entire contents of which are hereby incorporated by reference.

FIELD OF TECHNOLOGY

The following relates to the repair of subsea cables. In particular, the following relates to repairing subsea cables in situ, apparatus enabling such repair as well as kits for producing such apparatus.

BACKGROUND

Subsea cables are commonly used to transfer power and/or data between remote locations. The cables are typically laid along the seabed to avoid the need for complex supports or cable routing. They may be buried in the seabed and/or covered, for example, with concrete plates. Over time, cables may fail or become damaged. As those skilled in the art, damage to subsea cables will typically be in a specific location on the cable.

The operation of repairing damaged or faulty cable under the sea is challenging. As a result, the repair of a faulty underwater cable typically takes place on a specialist repair vessel, and broadly involves the following steps:
1. Pinpointing exactly where the fault is
2. Removal of any burial or protection (e.g. concrete panels) placed over the cable for distances of sufficient length to permit repair on either side of the fault
3. Removal of a section of cable by cutting either side of the fault location using a suitably equipped remotely operated vehicle (ROV);
4. Recovery, to a vessel, of each end of the cable in turn;
5. Addition of a new section of cable between the cut ends; and
6. Return of the repaired section to the seabed.

The length of the new section of cable added as part of the repair is dictated by the water depth at the location of the fault. Generally speaking, the additional length required is approximately equal to three times the water depth at the repair location.

To ensure that the faulty section of cable has been removed, the repair method can also include the step of inspecting and testing a first recovered cut end of the cable being on board the vessel before returning it to the sea, marked with a buoy, while the second cut end is recovered. This requires the additional steps of applying a temporary protective coating to the first cut end of the cable to protect it once it is returned to the water, and subsequently removing this protective coating when completing the repair. In addition, if the first end is returned to the seabed it will need to be recovered twice. Each recovery operation can take as long as twenty-four hours to complete, slowing the repair operation and increasing the overall cost. The recovery operation is typically performed using a grapnel and this can put strain on the cable. Further, the recovery operation can also cause damage to the cable directly, so there is a risk that the cable end could acquire further damage on being recovered from the seabed.

It will be appreciated that repair of the cable will typically involve the insertion of a section of new cable being used in a repair operation. This can be problematic where the initial cuts are incorrectly located, so that additional cable has to be cut from one end to remove the fault following testing or inspection. Improvements in the precision of fault location have reduced the amount of existing cable that will typically be cut and discarded when a fault has been determined. However, with the existing repair systems, a significant amount of additional cable is still required to conduct the repair, particularly in deep water areas.

This additional cable has to be stored and carried on the vessel making the repairs, and additionally results in large loops of surplus cable when the repaired cable is returned to the seabed following the repair, neither of which is ideal. The need for long lengths of additional cable also increases repair costs, and problems with cable supply can lead to repairs being delayed. Repair loops, being perpendicular to the line of the cable, may also fall outside the consented corridor and bring complications and timing issues whilst requisite consent is achieved from the relevant parties.

SUMMARY

An aspect relates to an improved, efficient, method of repairing subsea cables with reduced waste and complexity, as well as apparatus (and kits for the production of such apparatus) which enables such methods to be carried out.

According to embodiments of the present invention there is provided a submersible habitat chamber providing a contained environment for repairing subsea cable, the habitat chamber comprising first and second shell parts assembled to at least partly define the contained environment, a first seal provided between the first and second shell parts, a cable seal provided for engagement with the cable, and at least one access port through at least one of the shell parts to allow a user to access the contained environment from outside the habitat.

The enclosure, or habitat, of embodiments of the present invention has been developed to allow access to a cable section for repair by divers in a contained environment. Using methods of fault location, the site of a required repair can be determined precisely. It thus becomes possible to conduct a suitable repair underwater using embodiments of the present invention, which advantageously minimises the amount of cable to be used and the complexity of the repair.

Additionally, where a cable has been buried or covered, for example with concrete panels, to prevent movement on the sea bed, the length of cable that needs to be uncovered or dug up when a repair is conducted in situ is far smaller than when conventional subsea repair methods are carried out.

Owing to its modular construction, the habitat of embodiments of the present invention can be easily transported to the seabed for assembly at the site of the subsea cable requiring repair. To facilitate manual manipulation and transport of the shell parts, they preferably have a maximum length greater than about 5.0 metres or of about 5.0, about 4.5, about 4.0, about 3.5, about 3.0, about 2.5, or about 2.0 metres.

As used herein, the term 'sea' is not to be given a purely literal meaning. While it is envisaged at the time of writing that the inventive advances presented herein are principally applicable to subsea cable repair, they may also be usefully employed in freshwater cable repair. Likewise, the term 'cable' is not to be given a purely literal meaning but should be interpreted broadly to encompass underwater conduits through which different resources may be carried, including electricity and data.

The shell parts of the apparatus are preferably at least partly or totally rigid. They may be formed of any suitable material known to those skilled in the art, for example plastics and/or metal such as steel, e.g. stainless steel. In embodiments of the invention, the shell parts are formed of a material which has a density that is equal to or greater than water.

The habitat can be configured to have any shape or size which facilitates repair of the subsea cable. In embodiments of the invention, the habitat is elongate. It may be of any shape in cross section, for example circular, oval, ovoid, triangular, square, rectangular, or other polygon having 5, 6, 7, 8 or more sides. The cross section of the habitat may be totally or partly constant. In embodiments where the habitat is partly constant, the length of the part of the habitat having a constant cross section may be at least about 50 cm, at least about 1 m, at least about 1.5 m, at least about 2 m, at least about 2.5 m, at least about 3 m, at least about 3.5 m, at least about 4 m or longer.

The habitat body comprises a plurality of shell parts which are preferably configured to enable them to be easily coupled beneath the sea. For example, the shell parts may be provided with coupling means, such as flanges that can be bolted together. Additionally or alternatively, the shell parts can be provided with coupling means such as mating parts and/or quick release locking mechanisms which enable them to be coupled together.

The shell parts are configured such that when they are connected to form the habitat, the connection between them forms a watertight seal. This seal may be provided solely by the close fit between the shell parts. Additionally or alternatively, one, some or all of the shell parts may be provided with sealing means, for example ring type seals.

The habitat may be made up of any number of shell parts although, to minimise the complexity of assembly, a smaller number of shell parts is preferable, for example, 2, 3 or 4.

The habitat may be provided with one or more legs. In embodiments of the invention, one, some or all of the legs may be of adjustable height to enable the habitat to be positioned on the seabed at an optimal height/orientation to facilitate repair of the cable.

One or more windows may be provided in at least one of the shell parts to allow a user to see into the interior of the habitat chamber from outside. The window/s may be formed of any suitable material known to one skilled in the art including reinforced glass and/or plastics material such as polycarbonate or the like.

The habitat is configured to receive a cable through its interior (the contained environment). To prevent the ingress of water into the contained environment at the location at which the cable enters the habitat, one or more cable seals may be employed. The one or more cable seals may be applied to the cable and/or may be brought into contact with the cable upon assembly of the habitat. The one or more cable seals may or may not be part of the habitat.

The cable seals may be provided at two opposite ends of the habitat, for example at opposite ends of a centreline. The or each cable seal may be compressible, for example by one of more seal retainers attachable to the habitat, to improve the seal with a subsea cable.

In embodiments of the invention, the habitat may be assembled around the cable to be repaired (e.g. an unbroken section of subsea cable or around a break or deliberate cut in the subsea cable). Alternatively, the habitat may be assembled, and the cut ends of a subsea cable may then be fed into the habitat for repair/coupling.

Window/s and/or access port/s may be provided in the habitat. In embodiments of the invention, the window/s and/or access port/s are located in opposing sides of one or more of the shell parts, to allow access to and/or inspection of opposing sides of a cable contained within the habitat chamber. In use, a cable may pass through an approximate centreline of the habitat chamber, and windows and/or access ports may be provided on opposite sides of this centreline.

The access port/s may be pre-fitted with gloves to enable the diver to manually manipulate the cable within the contained environment. Additionally or alternatively, the access port/s may be configured to be coupled to such gloves. The gloves may be of any configuration and/or be formed of any material provided that they permit cable repair in the habitat. Rubber, neoprene and/or other polymer materials, which may optionally be reinforced, are preferred. In embodiments of the invention, the gloves are a two section construction comprising gauntlet sections fixed in the access holes and hand sections.

In such embodiments, the gauntlet sections may be corrugated so as to fit closely with the user's wrist/forearm. Additionally or alternatively, the gauntlet section may be concertina-shaped, such that the axial length of the gauntlet section can be increased into the contained environment or decreased as needed by the user. The hand sections are preferably formed of thinner material than the gauntlet sections (to provide the user with increased dexterity/touch sensation) and are coupled to the gauntlet sections to form a watertight seal.

Doors may be provided on the outside of the habitat to selectively cover the access port/s when not in use.

To facilitate transport of the habitat and/or the shell parts, the habitat/shell parts may be provided with lifting means, for example rings.

The submersible habitat chamber may further comprise a light source, a camera and/or a mirror. In such embodiments, the light source, camera and/or mirror may be located within the contained environment to improve visibility of a cable during a repair operation.

The habitat of embodiments of the present invention is preferably provided with purging means, to facilitate the removal of water from the contained environment once the habitat is assembled. The purging means may comprise one or more purge gas inlets connected to a supply of purge gas through which purge gas can be pumped into the contained environment. The supply of purge gas may be remote from the habitat, e.g. a purge gas supply (e.g. a gas tank) on a surface vessel connected to the habitat via a gas line. Additionally or alternatively, the habitat itself may be provided with a gas supply, e.g. a weighted tank.

Using a gas, which may be air and/or an inert gas such as nitrogen, to purge the chamber provides a safe, dry, repair environment within the habitat chamber, and additionally provides some drying effect to the cable being repaired.

Additionally or alternatively, the purging means may comprise a water pump, for voiding the contained environment of water once assembled.

In embodiments in which the habitat comprises purging means, the habitat may also be provided with a purge outlet through which purged water can exit the contained environment into the surrounding sea. In its simplest form, the purge outlet is one or more openings in the wall of the habitat. In such embodiments, the opening/s may be located on the underside of the habitat. The opening/s may be provided with closure means, e.g. a cap or lid which can be used to close the opening/s once seawater has been purged from the contained environment.

In embodiments of the invention, the habitat may be provided with washing means, to enable the interior of the habitat and the cable being repaired to be washed with a washing fluid, for example water (e.g. fresh water or distilled water) and/or a solvent capable of removing sea water deposits from the contained environment and cable.

In such embodiments, the washing means may comprise one or more washing fluid inlets connected to a supply of washing fluid through which washing fluid can be pumped into the contained environment. The washing fluid inlet/s may be provided in one or more nozzles situated in the contained environment. Additionally or alternatively one or more washing fluid inlet/s may be provided in directable means (e.g. a gun) enabling the user to direct washing fluid as needed.

The supply of washing fluid may be remote from the habitat, e.g. a washing fluid supply (e.g. a washing fluid tank) on a surface vessel connected to the habitat via a line. Additionally or alternatively, the habitat itself may be provided with a washing fluid supply, e.g. a tank.

In embodiments of the invention, the habitat may be provided with drying means. These may be employed after the interior of the habitat/cable being repaired is washed and/or purged, to provide a dry repair environment. The drying means may comprise one or more drying gas inlets connected to a supply of drying gas through which drying gas can be pumped into the contained environment. The supply of drying gas may be remote from the habitat, e.g. a drying gas supply (e.g. a gas tank) on a surface vessel connected to the habitat via a gas line. Additionally or alternatively, the habitat itself may be provided with a drying gas supply, e.g. a weighted tank. The drying gas may be air and/or an inert gas for example nitrogen.

The drying gas inlet/s may be provided in one or more nozzles situated in the contained environment. Additionally or alternatively one or more drying gas inlet/s may be provided in directable means (e.g. a gun) enabling the user to direct drying gas as needed.

In embodiments of the invention, the habitat is provided with differential pressure control means. Such means function to maintain a controlled pressure within the habitat once assembled at which repair can effectively and safely be carried out.

The differential pressure control means may comprise one or more pressure sensors. Preferably, the differential pressure control means comprises a plurality of pressure sensors, with at least one interior pressure sensor which senses the pressure in the contained environment and at least one exterior pressure sensor which senses the pressure at the exterior of the habitat. The readings from the interior and exterior sensor/s enable the differential pressure to be determined, i.e. the difference in pressure between the contained interior and the exterior of the habitat.

The differential pressure control means may additionally or alternatively comprise pressure adjustment means which enable a target differential pressure to be achieved. In embodiments of the invention, the pressure adjustment means comprise one or more pressure adjustment gas inlets connected to a supply of pressure adjustment gas through which pressure adjustment gas can be pumped into the contained environment. The supply of pressure adjustment gas may be remote from the habitat, e.g. a pressure adjustment gas supply (e.g. a gas tank) on a surface vessel connected to the habitat via a gas line. Additionally or alternatively, the habitat itself may be provided with a gas supply, e.g. a weighted tank. The pressure adjustment gas may be air and/or an inert gas for example nitrogen.

Additionally or alternatively, the pressure adjustment means may additionally comprise venting means, for example one or more controllable pressure adjusting gas outlets which enables gas to be vented from the contained environment to the exterior. One or more of the gas outlets may be provided with a valve. This valve may be configured with a predetermined threshold pressure (that may be fixed or adjustable by a user or by control means) so that pressure is only released from the contained environment once a pressure at or in excess of the target differential pressure in the contained environment is achieved. The release of pressure from within the contained environment may also occur as a result of gas leaving the contained environment via the purge outlet (where employed).

The advances of embodiments of the present invention may be realized when the contained environment is maintained at a differential pressure which is lower than, equal to or greater than the external pressure at the depth at which the habitat is positioned. However, the present inventors have found that optimal results are obtained when the differential pressure within the contained environment of the habitat is equal to or greater than the external pressure. In preferred embodiments of the invention, the differential pressure within the contained environment is from about 0 Pa, about 500 Pa or about 1000 Pa to about 4000 Pa, about 6000 Pa, about 8000 Pa, about 10000 Pa, about 20000 Pa or about 50000 Pa greater than the external pressure at the depth at which the habitat is positioned.

In embodiments of the invention, the differential pressure control means may comprise a user interface on which the interior pressure, the exterior pressure and/or the pressure differential may be presented to a user. The user can then control the pressure adjustment means (optionally via the user interface) to ensure that the target differential pressure is maintained. In embodiments of the invention, the user interface may be located on a surface vessel. A user interface may additionally or alternatively be provided on the exterior or interior of the habitat.

As will be appreciated, in embodiments of the invention, gas may be supplied to the contained environment within the habitat in order to purge water therefrom, to dry the interior and/or to adjust the pressure within the contained environment. In such embodiments, the purge, drying and/or pressure adjustment gas may be provided from a common supply (e.g. a single tank). Where the common supply is located remotely from the habitat (e.g. on a surface vessel), the purge, drying and/or pressure adjustment gas may be fed to the habitat via a common line. Further, common inlet/s may function as the purge gas inlet/s, the washing fluid inlet/s, the drying gas inlet/s and or the pressure adjustment gas inlet/s.

To prevent potentially hazardous pressures building up in the contained environment (e.g. as a result of malfunction in the pressure adjustment means), the habitat may be fitted with an emergency pressure release valve.

Where the habitat chamber comprises one or more compressible cable seals, the method may additionally comprise the step of compressing the or each cable seal after the habitat chamber has been assembled around a section of the subsea cable. The or each cable seal may be compressed by attaching one or more seal retainers to the assembled habitat chamber and tightening the one or more seal retainers against the or each cable seal.

The one or more seal retainers, if provided, may be attached and tightened using bolts. Similarly, the habitat chamber may be assembled by bolting the first and second shell parts together.

As mentioned above, one of the advantages of the habitat of embodiments of the present invention is that it can be easily and conveniently be assembled underwater to provide a habitat which enables subsea cables to be repaired and manipulated. Thus, according to a further aspect of embodiments of the present invention, there is provided a kit for assembling the submersible habitat chamber of the above first aspect comprising a plurality of shell parts. The kit may additionally be provided with instructions to assemble the habitat.

According to a still further aspect of embodiments of the present invention, there is provided a method of subsea cable repair comprising:

locating a fault in said subsea cable;

deploying a submersible habitat chamber according to any of the preceding claims;

assembling the habitat chamber;

purging the habitat chamber to expel sea water from within the assembled habitat chamber; and conducting a repair operation on the section of subsea cable from outside the habitat chamber, wherein the habitat chamber is assembled around a section of the subsea cable or the subsea cable is cut to provide exposed cut ends of the cable, the habitat chamber is assembled and one or both of the exposed cut ends of the subsea cable are fed into the habitat chamber.

Once a fault location of the cable has been determined, the component parts of the habitat are deployed, e.g. lowered from a surface vessel, to the fault location. The habitat chamber may then be assembled.

In embodiments of the invention, the habitat chamber is assembled by bolting the first and second shell parts together. This provides a contained environment in which the cable repair can take place. The habitat may be assembled around a break in the cable, or an unbroken section of cable.

In embodiments of the invention, the or each cable seal after the habitat chamber has been assembled is compressed around a section of the subsea cable, for example by attaching one or more seal retainers to the assembled habitat chamber and tightening the one or more seal retainers against the or each cable seal. This can be achieved using bolts.

To facilitate repair of the cable, the height and orientation of the habitat may be adjusted, for example by adjusting the height or one, some or all of adjustable legs provided on the habitat.

The method of embodiments of the present invention may be carried out as described herein. For example, the method may comprise steps in which water is purged from the interior of the assembled chamber, optionally via a purge outlet, using purging means such as pumped gas and/or a water pump. The method of embodiments of the invention may also comprise a washing step where washing fluid is fed into the assembled habitat as explained above. A drying step may be carried out post purge/washing to dry the interior of the assembled habitat, again, as explained above.

In embodiments of the invention, once the habitat is assembled and prior to the repair operation being initiated, the pressure within the contained environment within the assembled habitat is adjusted to achieve and maintain a target differential pressure, for example within is about 0 Pa, about 500 Pa or about 1000 Pa to about 4000 Pa, about 6000 Pa, about 8000 Pa, about 10000 Pa, about 20000 Pa or about 50000 Pa of the exterior pressure at the operating depth.

Those skilled in the art will recognise that subsea cables may be partially or totally buried in the seabed. Thus, the method outlined above may additionally comprise the steps of excavating the cable prior to repair and/or reburying the repaired cable.

One advantage of repairing cables in situ at the seabed is that the risk of them being further damaged through being hauled to the water surface is minimised. Indeed, in processes of embodiments of the present invention, the cable to be repaired can be partially cut in the subsea environment before being fully repaired during the repair operation within the assembled habitat. Accordingly, in embodiments of the present invention, a partial cut is made to the cable to facilitate repair prior to assembly of the habitat chamber. Such a cut may remove one or more protective sheath/armour layers from the cable.

To minimise the risk of damage to the habitat and/or equipment used or injury to the subsea operatives, once the repair operation is complete, the habitat is flooded prior to its component parts being recovered to the surface. This may be achieved by adjusting the differential pressure control means to achieve a pressure within the assembled chamber which is equal to or lower than the external pressure at the operating depth.

For the avoidance of doubt, where reference is made herein to a characteristic or property of the habitat of the first aspect of embodiments of the invention (or component thereof), or how that habitat/component may be assembled or operated, such references apply equally to the kit and method aspects of embodiments of the present invention.

BRIEF DESCRIPTION

Some of the embodiments will be described in detail, with references to the following Figures, wherein like designations denote like members, wherein.

DETAILED DESCRIPTION

Figure 1:
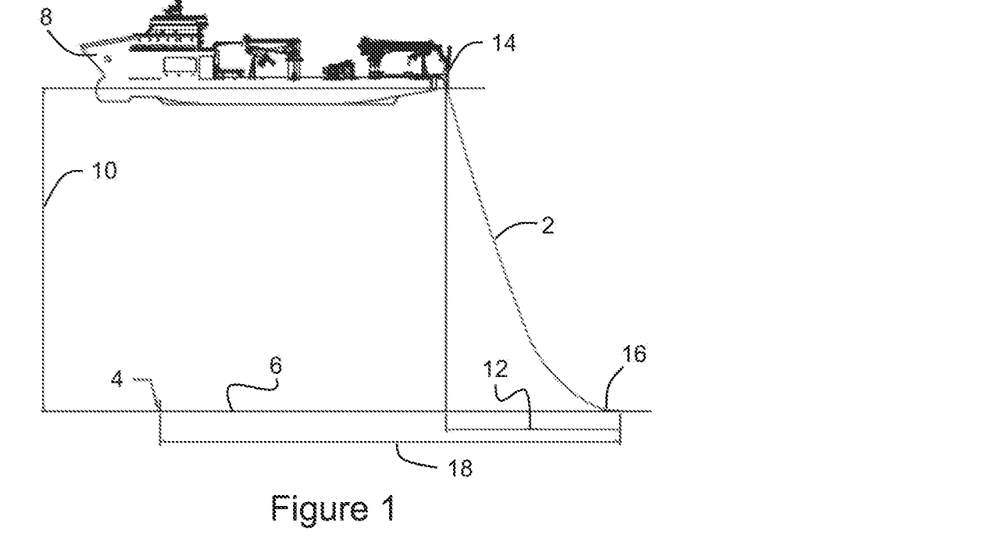
FIG. 1 is a side view illustrating a typical subsea cable repair operation.
Figure 2:
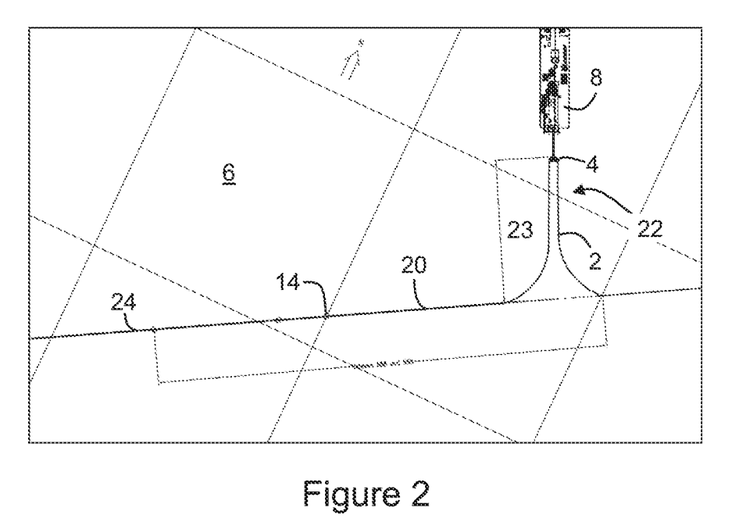
FIG. 2 is a plan view of a subsea cable being returned to the seabed following repair.

A conventional repair method used for subsea cables is briefly illustrated in FIGS. 1 and 2.

FIG. 1 shows the operation when a length of cable 2 has been cut at a location 4 and recovered from the seabed 6 onto a dedicated repair vessel 8. As shown in FIG. 1, the free/cut end of the length of cable 2 is located on the vessel 8 for inspection and testing prior to being either coated, marked, and returned to the sea or joined to a length of new cable stored on the vessel 8. It can be seen that the new cable has to bridge a significant gap even if no cable is removed during the repair. The precise length of new cable required is dependent on the water depth 10 at the repair location, but also on the physical properties of the cable. The cable properties impact on the shape adopted by the cable 2 during recovery, and thus on both the horizontal distance 12 between the cut end 14 of the recovered cable 2 and the point 16 where the recovered cable 2 leaves the seabed 6, and the distance 18 between said point 16 and the original cut location 4. In most cases, it is expected that the length of additional cable required will be around three times the water depth 10 at the repair location.

FIG. 2 shows the end of a repair operation. An additional length of new cable 20 has been spliced into place between the cut ends 4,14, and forms a loop 22 with the originally recovered cable 2. The loop 22 is then returned to the seabed 6 by the vessel 8, where it lies approximately at right angles to the remainder of the cable 24. The length 23 of the loop 22 is roughly equal to the water depth 10 where the repair was made, and can provide a significant obstacle on the seabed 6 extending laterally from the recognised path of a cable 24. There is therefore an increased risk of subsequent damage to the repaired cable section, due to its departure from the known cable location.

The main drawbacks of the described repair system are that it is time consuming, costly, and requires a maintained supply of spare cable. These drawbacks can all be associated with the need to recover the cable to the surface for repairs. The recovery process also risks additional damage to the cable, and the resulting loop in the repaired cable is itself more susceptible to subsequent damage once returned to the seabed. There was, therefore, a need to pioneer a way of repairing subsea cable in situ on the seabed with minimal intrusion on the asset and its integrity.

Figure 3:
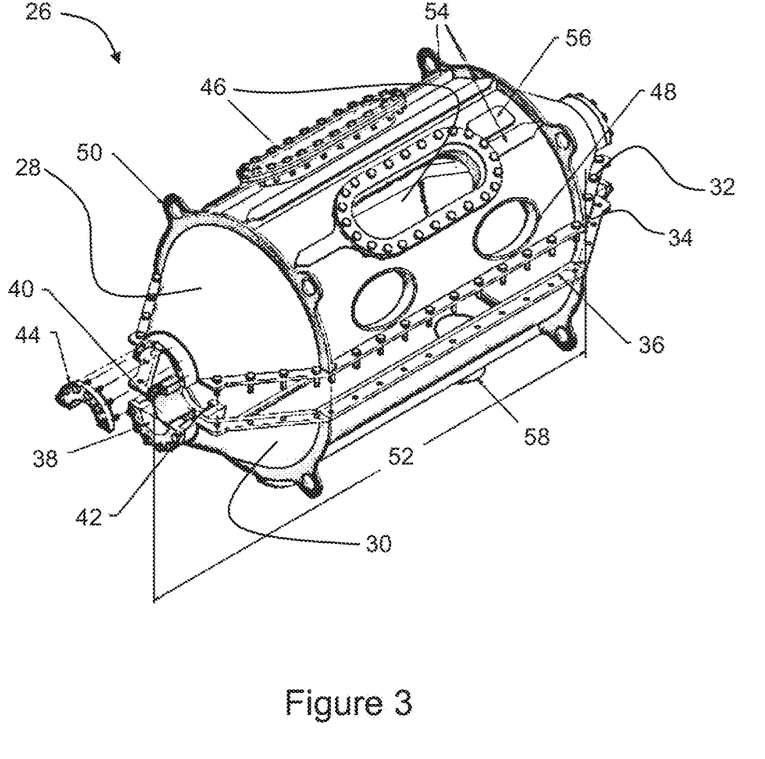
FIG. 3 is a perspective view of a habitat/enclosure according to embodiments of the present invention.

FIG. 3 shows an enclosure, or habitat 26, according to embodiments of the present invention. The body of the habitat 26 is formed predominantly from steel, and comprises an upper half shell 28 and a lower half shell 30 for assembly around a subsea cable. In the illustrated embodiment, the habitat is generally cylindrical and has a circular cross section. Each half shell 28,30 is provided with an outwardly extending flange 32,34 via which the two half shells 28,30 are bolted together to form the complete habitat 26.

A ring seal 36 is bonded in place in a groove provided in the flange 34 of the lower half shell 30 to ensure a good seal between the two half shells 28,30. Openings 38 are provided at each end of the habitat 26 to create a through bore allowing a cable to pass through the habitat 26, and a compressible cable seals 40 are provided in each opening 38. The openings 38, or cable entry points, are created by semi-cylindrical channels provided at each end of each half shell 28,30, and the cable seals 40 are likewise provided as pairs of semi-cylindrical seal elements, each one being received in one of the semi-cylindrical channels. The end of the ring seal 36 meets each cable seal element at locations 42 either side of each opening 38 so that sealing means is provided around the entire periphery of the lower half shell 30.

The cable seals 40 are held in place and compressed by semi cylindrical seal retainers 44 which are bolted, in use, to the ends of the semi-cylindrical channels in each end of each half shell 28,30. Through varying the amount of compression applied by the seal retainers 44 to the sealing elements, the cable seals 40 can apply a varying amount of force to a cable received within the habitat. This facilitates sealing to a variety of cable diameters and/or allows increased sealing force to be applied by the habitat 26, if required, to account for greater external water pressure at deeper operating depths.

The upper half shell 28 of the habitat 26 is provided with a pair of polycarbonate windows 46 so that the interior of the habitat is visible from the outside. A pair of arm openings 48 are also provided in each side of the upper half shell 28 to allow manual access to the interior of the habitat 26. Although not shown in FIG. 1, gloves are sealed in place in the arm openings 48 to maintain the integrity of the habitat during use. Steel doors may also be provided to close the openings 48 in either side of the habitat when access is not required.

Lifting eyes 50 are provided both on the upper half shell 28 and the lower half shell 30 so that the two halves of the habitat 26 can be separately lowered to the repair location before assembly. In the illustrated embodiment, the overall length 52 of the habitat 26 is 1800 mm, meaning that the two half shells 28,30 are manageable and can be manipulated by hand once submerged.

Reinforcing ribs 54 are provided on the walls of the habitat 26 for strength, and a reinforcing bulkhead 56 is also provided to cater for services such as lighting and other ancillary services, such as washing means, drying/purging means and/or a video feed. Finally, the lower half shell 30 is provided with an opening or port 58 in its underside to allow purging of the chamber once assembled and subsequent removal of water ingress.

Figure 4:
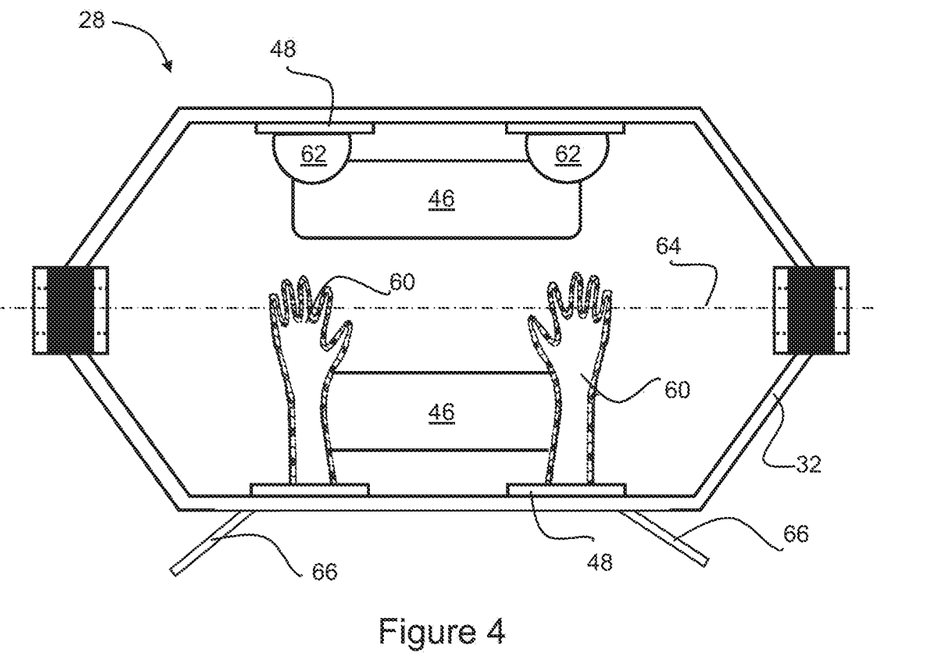
FIG. 4 is a schematic view of the inside of the upper part of the habitat of FIG. 3, in accordance with embodiments of the present invention.

FIG. 4 shows a schematic view of the interior of the upper half shell 28, with the viewing windows 46 visible. Gloves 60 are shown extending through the arm openings 48 in one side of the half shell 28 into the interior. Gloves 62 on the opposite side of the half shell 28 are indicated in a limp or non-extended state. It should be clear that the extended gloves 48 are sufficiently long to provide access to the mid-line 64 of the habitat 26 where the cable repair will be carried out. Also illustrated in FIG. 4 are hinged steel doors 66 for selectively covering the outsides of the arm openings 48 in the upper half shell 28. Two doors 66 are shown in an open position allowing access to the extended gloves 60. Similar doors are also provided on the opposite side of the upper half shell 28.

Figure 5:
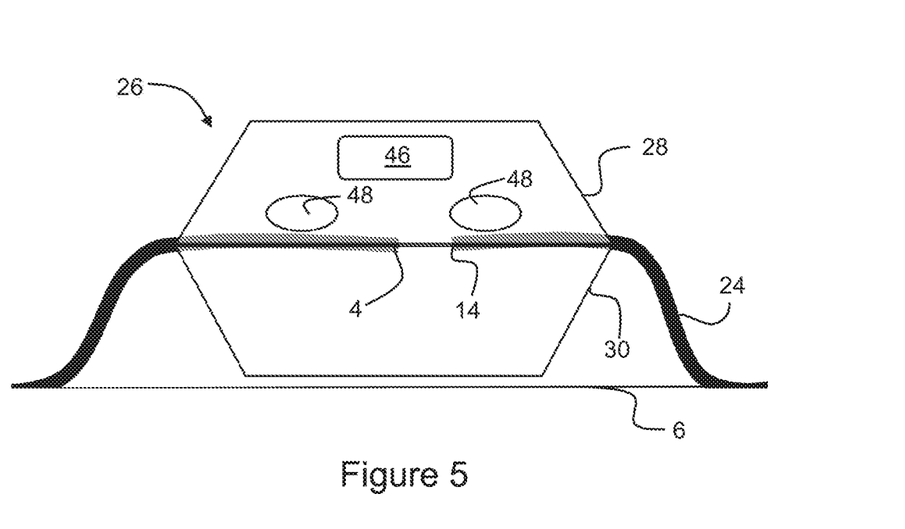
FIG. 5 is a schematic side view of the habitat assembled around a cable to be repaired, in accordance with embodiments of the present invention.

FIG. 5 shows a schematic view of the habitat 26 located on the seabed 6 and assembled around a cable 24 to be repaired. The cable 24 is sealed between the upper and lower half shells 28,30 of the habitat 26, and repair access is provided the arm openings 48 while visual inspection of the repair operation is possible via the illustrated window 46.

As illustrated, the cable 24 has been severed, either while being damaged or as a part of the repair operation, so that cut ends 4,14 of the cable exist within the habitat 26. However, it should be understood that the ability to assemble the habitat 26 around a cable 24 allows repairs to be carried out without cutting the cable 24 if it is not necessary to do so, for example if the repair involved patching a breach in the cable sheath, and with minimal manipulation and movement of the cable 24. In the described prior art repair method, a cable will necessarily be cut in order for it to be recovered to a vessel.

In use, the upper and lower half shells 28,30 of the habitat 26 are lowered to the seabed 6 and assembled around the region of cable 24 to be repaired. The flanges 32,34 are then bolted together and the seal retainers 44 are bolted in place to compress the cable seals 40 around the cable 24. Adjustable height legs (not shown) are fitted on to the flanges 32, 34 and hold the habitat at an appropriate working height/orientation off the seabed.

The habitat is then purged with nitrogen to expel sea water from the habitat 26 and provide a dry pressure contained environment such that the pressure within the contained environment within the habitat is maintained at a pressure of around 2000 Pascals greater than the external pressure at the operating depth, in which to carry out the repair. Maintenance of the differential pressure is achieved through the differential pressure control system operated by a user on the surface vessel who is presented on a user interface with the differential pressure obtained from readings from sensors on the exterior and interior of the habitat (not shown). The user can then control pressure within the habitat by pumping/venting gas into/out of the habitat as needed.

The repair work is carried out by divers situated outside the habitat 26, using the gloves 60,62 to access the cable 24 via the arm openings 48. The divers can observe the repair operation directly through the windows 46 provided in the upper half shell 28, but it is envisaged that mirrors and/or cameras could additionally be provided within the habitat 26, for example to allow the divers to view the entire circumference of the cable and to account for any obscured regions and/or to allow remote monitoring of the repair operation.

The necessary tools for conducting the repair, along with possibly some short lengths of replacement cable, may also be contained within the sealed environment of the habitat 26 ready for use.

Once the necessary repair has been carried out, the repaired cable 24 can, if required, be tested remotely while still within the habitat. If the test results are unsatisfactory, further inspection or repair, using the habitat 26, can be carried out with minimal inconvenience.

Once all repair work has been completed the pressure within the chamber is gradually released, this being controlled by the differential pressure control system which allows re-flooding of the habitat 26 before the habitat 26 is dismantled to leave the repaired cable 24 in place on the seabed 6.

The habitat 26 may find use where a cable repair does not involve the removal and replacement of a significant section of damaged cable. Where a relatively large length of cable has to be removed and discarded as part of the repair operation, it may still be necessary to initially recover the cable 24 to a vessel in order to remove and replace the damaged section. However, since the final repair can still be conducted on the seabed, the additional lateral loop 22 of cable resulting from the known repair method can be avoided.

The robust construction of the habitat 26 and the reliability of the seals provided, at least partly by the compressible cable seals 40, allows the creation of a pressure controlled environment within the habitat suitable for use even at significant working depth.

The habitat 26 provides an environment for the subsea repair of cable faults by divers. Use of the habitat 26 obviates, in many cases, the need for significant amounts of spare cable and qualified jointers as well as specialist cable repair ships. The time and cost of cable repair is thereby significantly reduced.

The foregoing description is provided by way of example only, and is not intended to limit the scope of protection sought. A number of modifications to the illustrated embodiment would be possible within the scope of what is subsequently claimed. For example, the seal retainers 44 and/or cable seals 40 may be assembled at right angles to half shells 28,30 and/or the cable seals 40 could be assembled to the cable 24 before the habitat 26 is assembled. Alternatively, or additionally, the half shells 28,30 could be connected to one another, for example by a hinge at one edge, to simplify alignment during assembly of the habitat 26 around a cable 24.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A submersible habitat chamber providing a contained environment for repairing subsea cable, the submersible habitat chamber comprising:
   a first shell part and a second shell part assembled to at least partly define the contained environment;
   a first seal provided between the first shell part and the second shell part;
   one or more cable seals provided for engagement with the subsea cable; and
   one or more access ports through at least one of the first shell part and the second shell part to allow a user to access the contained environment from an outside the submersible habitat chamber;
   wherein one or more gloves are sealed into the one or more access ports to maintain a barrier between the outside of the submersible habitat chamber and the contained environment.

2. The submersible habitat chamber according to claim 1, wherein the one or more gloves comprise gauntlet sections, fixed in the one or more access ports, and hand sections, further wherein the hand sections are formed of a thinner material than the gauntlet sections.

3. The submersible habitat chamber according to claim 1, further comprising: a differential pressure control system to permit the contained environment to be maintained at a target differential pressure during subsea cable repair.

4. The submersible habitat chamber according to claim 3, wherein the differential pressure control system comprises pressure sensors provided outside of the submersible habitat chamber and inside the contained environment.

5. The submersible habitat chamber according to claim 3, further comprising a gas supply or gas tank for the differential pressure control system.

6. The submersible habitat chamber according to claim 3, wherein the target differential pressure is from about 0 Pa, about 500 Pa or about 1000 Pa to about 4000 Pa, about 6000 Pa, about 8000 Pa, about 10000 Pa, about 20000 Pa or about 50000 Pa greater than the external pressure at a depth at which the submersible habitat chamber is positioned.

7. The submersible habitat chamber according to claim 6, wherein the target differential pressure is about 2000 Pa greater than the external pressure at the depth at which the submersible habitat chamber is positioned.

8. The submersible habitat chamber according to claim 1, wherein the submersible habitat chamber is provided with one or more legs which are height adjustable.

9. The submersible habitat chamber according to claim 1, wherein a window is provided in at least one of the first shell part and the second shell part.

10. The submersible habitat chamber according to claim 1, further comprising two windows, in opposing sides of the first shell part and the second shell part.

11. The submersible habitat chamber according to claim 1, wherein the one or more access ports are provided in two opposing sides of the first shell part and the second shell part.

12. The submersible habitat chamber according to claim 1, wherein one or more doors are provided on the outside of the submersible habitat chamber to selectively cover the one or more access ports.

13. The submersible habitat chamber according to claim 1 wherein the one or more cable seals are provided at two opposite ends of the submersible habitat chamber.

14. The submersible habitat chamber according to claim 1, wherein the one or more cable seals are compressible.

15. The submersible habitat chamber according to claim 14, further comprising one of more seal retainers, attachable to the submersible habitat chamber to compress the one or more cable seals.

16. The submersible habitat chamber according to claim 1, further comprising a light source within the contained environment.

17. The submersible habitat chamber according to claim 1, further comprising a camera within the contained environment.

18. The submersible habitat chamber according to claim 1, further comprising a mirror within the contained environment.

19. The submersible habitat chamber according to claim 1, wherein the habitat further comprises a purging system, a washing system and/or a drying system.

20. The submersible habitat chamber according to claim 19, further comprising a fluid supply or tank for the purging system, washing system and/or drying system.

21. The submersible habitat chamber according to claim 1, wherein the first shell part and the second shell part are at least partially rigid.

22. The submersible habitat chamber according to claim 1, wherein the first shell part and the second shell part are assembled together using one or more quick release locking mechanisms provided on one or both of the first shell part and the second shell part.

23. The submersible habitat chamber according to claim 1, wherein the first shell part and the second shell part have a maximum length greater than about 5.0 metres or of about 5.0, about 4.5, about 4.0, about 3.5, about 3.0, about 2.5, or about 2.0 metres.

24. The submersible habitat chamber according to claim 1, wherein the first shell part and the second shell part have a maximum length of about 1.8 metres.

25. A kit of parts comprising the first shell part and the second shell part for use in assembling the submersible habitat chamber according to claim 1.

26. A method of repairing a subsea cable in a subsea environment, the method comprising:
   locating a fault in the subsea cable;
   deploying the submersible habitat chamber according to claim 1;
   assembling the submersible habitat chamber;
   purging the submersible habitat chamber to expel sea water from within the assembled submersible habitat chamber; and
   conducting a repair operation on the section of the subsea cable from outside the submersible habitat chamber;
   wherein the submerisble habitat chamber is assembled around a section of the subsea cable or the subsea cable is cut to provide exposed cut ends of the subsea cable, the submersible habitat chamber is assembled and one or both of the exposed cut ends of the subsea cable are fed into the submersible habitat chamber.

27. The method according to claim 26, wherein a gas is used to purge the submersible habitat chamber, the gas being air and/or an inert gas, the inert gas being a nitrogen gas.

28. The method according to claim 27, further comprising washing the submersible habitat chamber and/or a section of the subsea cable within the submersible habitat chamber and drying the chamber and/or the section of the subsea cable within the submersible habitat chamber.

29. The method according to claim 26, further comprising maintaining a pressure within the assembled submersible habitat chamber using a differential pressure control means at a target differential pressure, within about 0Pa, about 500 Pa or about 1000 Pa to about 4000 Pa, about 6000 Pa, about 8000 Pa, about 10000 Pa, about 20000 Pa or about 50000 Pa greater than the external pressure at a depth at which the submerzible habitat chamber is positioned, during the repair operation.

30. The method according to claim 26, wherein the submersible habitat chamber is provided with one or more adjustable legs, the method comprising adjusting a height and/or an orientation of the submerzible habitat chamber.

31. The method according to claim 26, wherein the submersible habitat chamber is assembled around a broken or unbroken section of the subsea cable.

32. The method according to claim 26, wherein the one or more cable seals of the submersible habitat chamber are compressible, and the method further comprises compressing the one or more cable seals after the submersible habitat chamber has been assembled around a section of the subsea cable.

33. The method according to claim 32, wherein the one or more cable seals are compressed by attaching one or more seal retainers to the assembled submersible habitat chamber and tightening the one or more seal retainers against the one or more cable seals.

34. A submersible habitat chamber providing a contained environment for repairing subsea cable, the submersible habitat chamber comprising:
   a first shell part and a second shell part assembled to at least partly define the contained environment;
   a first seal provided between the first shell part and the second shell part;
   one or more cable seals provided for engagement with the subsea cable; and
   one or more access ports through at least one of the first shell part and the second shell part to allow a user to access the contained environment from an outside the submersible habitat chamber;
   wherein the habitat further comprises a purging system, a washing system and/or a drying system.

* * * * *